United States Patent Office 3,748,251
Patented July 24, 1973

3,748,251
DUAL RISER FLUID CATALYTIC CRACKING WITH ZSM-5 ZEOLITE
Edward J. Demmel, Pitman, and Hartley Owen, Belle Mead, N.J., assignors to Mobil Oil Corporation
No Drawing. Filed Apr. 20, 1971, Ser. No. 135,783
Int. Cl. C01b 33/28; C10g 11/18
U.S. Cl. 208—74
30 Claims

ABSTRACT OF THE DISCLOSURE

A method of cracking a hydrocarbon charge stock which comprises passing said charge stock into a reaction zone together with a catalyst composition comprising two cracking components, one of which is a zeolite component identified as a ZSM-5 type zeolite, withdrawing said catalyst composition from the reaction products, withdrawing hydrocarbon from the reaction zone, separating unreacted hydrocarbon charge and introducing unreacted hydrocarbon charge into a second reaction zone together with a catalyst composition comprising two cracking components one of which is a zeolite component identified as ZSM-5 type zeolite, withdrawing the reaction components and recovering liquid product.

BACKGROUND OF THE INVENTION

Field of the invention

This invention relates to a two step catalytic cracking of hydrocarbon components, especially gas oils. Particularly contemplated is a cracking scheme wherein the virgin stock is reacted under fluid catalytic cracking conditions with a catalyst composition containing two distinct cracking components one of which is a ZSM-5 type zeolite as more particularly described hereinbelow. Hydrocarbon effluent from the fluid catalytic cracking in the first reaction zone is withdrawn and unreacted charge is separated therefrom. The unreacted charge is routed to a second fluid catalytic cracking zone, generally maintained under more severe conditions than the first reaction zone and is contacted with a catalyst composition comprising two cracking components one of which is a zeolite component identified as a ZSM-5 type zeolite.

The present invention particularly contemplates a fluid catalytic cracking process wherein such a catalyst composition and a virgin gas oil are passed through a first riser, hydrocarbon containing products of the cracking in the riser are separated from the catalyst and both are removed. The unreacted gas oil is separated from the other components and the unreacted gas oil together with catalyst composition is passed under fluid catalytic cracking conditions through a riser maintained under more severe conditions to convert a greater quantity of the gas oil into useful cracked products.

Discussion of the prior art

For many years gas oils have been cracked to more useful components, e.g. gasoline components, over silica/alumina compositions. More recently, crystalline aluminosilicates such as zeolites X and Y have been employed as cracking components in a catalyst composition. To facilitate continuous cracking of the gas oil and to optimize the cracking process, fluid catalytic cracking was developed. In fluid cracking operations, the catalyst composition and the charge are passed either concurrently or countercurrently. The reaction product is distilled into its components and unreacted gas oil is recycled to a cracking reaction zone. The catalyst composition, if necessary, is regenerated in a separate vessel and the so regenerated material is introduced concurrently or countercurrently to the gas oil charge for additional cracking.

Catalytic cracking processes have been developed wherein there are at least two fluid catalytic cracking reaction zones known as risers. Generally speaking, a gas oil charge is passed into a first riser concurrently with a cracking catalyst. Thereafter, the hydrocarbon components are separated from the catalyst and unreacted gas oil is recirculated to a second fluid catalytic cracking reaction zone, i.e. second riser. Together with this recycled gas oil, there is passed through the riser additional cracking catalyst. In such case, the second riser may be operated under different conditions of severity, e.g. catalyst to oil ratio, temperature, etc.

The conditions under which catalytic cracking is performed are intimately related to the product to be obtained. In more recent years, there has been an increasing emphasis in obtaining gasoline fractions characterized by a high octane value. This problem has become even more acute with the desirability of obtaining higher octane gasolines without the use of compounds such as tetraethyllead.

In cracking gas oils, certain products are obtained which are characterized by low octane values in relation to other products obtained during the same cracking reaction. Thus, it is not uncommon for a gas oil to yield, when cracked, a significant amount of normal paraffins intermixed with isoparaffins. These normal paraffins are substantially inferior in terms of octane value to the isoparaffins and some of the other components of the liquid product. It has become desirable, therefore, in the cracking of gas oils to minimize the synthesis of these less desirable cracking reaction products and to recover gasoline fractions having increased octane value. Moreover, it has become desirable to provide a catalyst cracking process which, in situ, converts these less desirable components to products which can be useful in preparing other gasoline components, e.g. olefins to be employed for alkylation.

SUMMARY OF THE INVENTION

A method of cracking a hydrocarbon charge stock which comprises passing said charge stock into a reaction zone together with a catalyst composition comprising two cracking components, one of which is a ZSM-5 type zeolite, withdrawing said catalyst composition from the reaction products, separating unreacted hydrocarbon charge from cracking products and introducing unreacted hydrocarbon charge into a second reaction zone together with a catalyst composition comprising two cracking components one of which is a ZSM-5 type zeolite component, withdrawing the reaction components and recovering liquid product.

DESCRIPTION OF SPECIFIC EMBODIMENTS

Generally speaking, the process of the present invention involves the use of a catalyst composition comprising two distinct fluid catalytic cracking components. These catalytic components can be intimately admixed with one another or can be maintained within a common bonding agent or porous matrix. General speaking, the common bonding agent can be a clay such as a kaolin clay, a bentonite clay or a montmorillonite clay. Generally speaking, the cracking components comprise between 2 and 25 percent by weight based on the total weight of the catalyst composition. Additionally or alternatively, the common bonding agent can be an inorganic oxide matrix material such as a siliceous matrix material. In such case, the siliceous matrix component can be composited with another inorganic oxide material to form a binary matrix material such as alumina, zirconia, germania and the like. Additionally, the porous matrix component can be a ternary system such as silica-alumina-thoria, silica-alumina-zirconia, silica-alumina-magnesia or silica-magnesia-zirconia. The porous matrix employed can be in the form of a cogel. It is to be understood that the term "porous matrix" includes inorganic compositions with which the cracking components can be combined, dispersed or otherwise intimately admixed wherein the matrix may be active or inactive. It is to be understood that the porosity of the compositions employed as a matrix can either be inherent in the particular material or can be introduced by mechanical or chemical means. Representative matrixes which can be employed include metals and alloys thereof, sintered metals and sintered glass, asbestos, silicon carbide aggregates, pumice, firebrick, diatomaceous earths and inorganic oxides. The inorganic oxides of a siliceous nature are preferred. Of these matrixes, inorganic oxides such as clay, chemically treated clay, silica and silica alumina are particularly preferred because of their superior porosity, attrition resistance and stability under the reaction conditions employed during fluid catalytic cracking of gas oil.

As indicated above in the multi-riser catalytic cracking process of the present invention, there is generally employed a catalyst composition comprising two distinct cracking components. One component is a catalytically active form of a ZSM–5 type zeolite. The other component can be any other catalytic cracking component active with respect to the molecular constituents of the hydrocarbon charge. Generally speaking, the cracking component will be a porous cracking component such as silica/alumina and more especially a crystalline aluminosilicate zeolite component having uniform pore dimensions and a pore size from about 6 to 15 angstrom units. These large pore zeolite components will admit both normal and iso-aliphatics. Particularly desirable zeolites include the synthetic faujasites known as zeolite X and zeolite Y. Other large pore zeolites can also be employed. The weight ratio of the porous cracking component, e.g. synthetic faujasite, to the ZSM–5 component is between 0.1 and 20.

The ZSM–5 type zeolites which are used in combination with the large pore zeolites in the novel cracking process of this invention can generally be stated to be intermediate between the two types of aluminosilicates previously described. Thus, the ZSM–5 type catalysts used in the novel process of this invention will allow the entry into their internal pore structure of normal aliphatic compounds and slightly branched aliphatic compounds, particularly monomethyl substituted compounds, yet substantially exclude all compounds containing at least a quaternary carbon atom or having a molecular dimension equal to or substantially greater than a quaternary carbon atom. Additionally, aromatic compounds having side chains similar to the normal aliphatic compounds and slightly branched aliphatic compounds above described could have said side chains enter the internal pore structure of the instant catalysts. Thus, if one were to measure the selectivity of the ZSM–5 type materials employed in the process of this invention with regard to their ability to sorb n-hexane in admixture with 2-methyl pentane, i.e., the ability to selectively sorb hexane from a mixture of the same with isohexane, these catalysts would have to be stated as being non-shape selective. It should be immediately apparent, however, that the term selectivity has a far greater significance than merely the ability to preferentially distinguish between normal paraffins and isoparaffins. Selectivity on shape is theoretically possible at any shape or size although, quite obviously, such selectivity might not result in an advantageous catalyst for any and all hydrocarbon conversion processes.

While not wishing to be bound by any theory of operation nevertheless, it appears that the crystalline zeolitic materials of the ZSM–5 type employed in the instant invention cannot simply be characterized by the recitation of a pore size or a range of pore sizes. It would appear that the uniform pore openings of this new type of zeolite are not approximately circular in nature, as is usually the case in the heretofore employed zeolites, but rather are approximately elliptical in nature. Thus, the pore openings of the instant zeolitic materials have both a major and a minor axes, and it is for this reason that the unusual and novel molecular sieving effects are achieved. This elliptical shape can be referred to as a "keyhole." It would appear that the minor axis of the elliptical pores in the zeolites apparently have an effective size of about 5.5 angstrom units. The major axis appears to be somewhere between 6 and about 9 angstrom units. The unique keyhole molecular sieving action of these materials is presumably due to the presence of these approximately elliptically shaped windows controlling access to the internal crystalline pore structure.

A test method has been devised in order to determine whether or not a zeolite possesses the unique molecular sieving properties necessary to be combined with a large pore zeolite in order to carry out the novel conversion process of this invention. In said test method a candidate zeolite free from any matrix or binder is initially converted to the so-called acid or hydrogen form. This procedure involves exhaustive exchange with an ammonium chloride solution in order to replace substantially all metallic cations originally present. The sample is then dried, sized to 20–30 mesh and calcined in air for 16 hours at 550° C. One gram of the so-treated zeolite is then contacted with benzene at a pressure of 12 mm. Hg at a temperature of 25° C. for a time period of two hours. Another gram sample is contacted with mesitylene at a pressure of 15 mm. Hg at a temperature of 25° C. for a period of six hours. A preferred zeolite is one whose acid form will adsorb at least 3.0 weight percent benzene and less than 1.5 weight percent mestiylene at the above-recited conditions.

Examples of zeolitic materials which are operable in the process of this invention are ZSM–5 type which family includes not only ZSM–5 but also ZSM–8 zeolites. ZSM–5 type materials are disclosed and claimed in copending application Ser. No. 865,472, filed Oct. 10, 1969, and ZSM–8 is disclosed and claimed in copending application Ser. No. 865,418 filed Oct. 10, 1969. A process utilizing a combination of ZSM–5 type zeolites and large pore zeolites is disclosed in S.N. 78,573 filed Oct. 6, 1970.

The family of ZSM–5 compositions has the characteristic X-ray diffraction pattern set forth in Table 1, hereinbelow. ZSM–5 compositions can also be identified, in terms of mole ratios of oxides, as follows:

$$0.9 \pm 0.2 M_{\frac{2}{n}} O : W_2O_3 : 5\text{-}100 YO_2 : zH_2O$$

wherein M is a cation, $n$ is the valence of said cation, W is selected from the group consisting of aluminum and gallium, Y is selected from the group consisting of silicon and germanium, and $z$ is from 0 to 40. In a preferred synthesized form, the zeolite has a formula, in terms of mole ratios of oxides, as follows:

$$0.9 \pm 0.2 M_{\frac{2}{n}} O : Al_2O_3 : 5\text{-}100 SiO_2 : zH_2O$$

and M is selected from the group consisting of a mixture of alkali metal cations, especially sodium, and tetraalkylammonium cations, the alkyl groups of which preferably contain 2–5 carbon atoms.

In a preferred embodiment of ZSM–5, W is aluminum, Y is silicon and the silica/alumina mole ratio is at least 10 and ranges up to about 60.

Members of the family of ZSM–5 zeolites possess a definite distinguishing crystalline structure whose X-ray diffraction pattern shows the following significant lines:

TABLE 1

| Interplanar spacing $d$ (A.): | Relative intensity |
|---|---|
| 11.1±0.2 | S |
| 10.0±0.2 | S |
| 7.4±0.15 | W |
| 7.1±0.15 | W |
| 6.3±0.1 | W |
| 6.04±0.1 | W |
| 5.97±0.1 | W |
| 5.56±0.1 | W |

TABLE 1—Continued

| | |
|---|---|
| 5.01±0.1 | W |
| 4.60±0.08 | W |
| 4.25±0.08 | W |
| 3.85±0.07 | VS |
| 3.71±0.05 | S |
| 3.64±0.05 | M |
| 3.04±0.03 | W |
| 2.99±0.02 | W |
| 2.94±0.02 | W |

These values as well as all other X-ray data were determined by standard techniques. The radiation was the K-alpha doublet of copper, and a scintillation counter spectrometer with a strip chart pen recorder was used. The peak heights, I, and the positions as a function of 2 times theta, where theta is the Bragg angle, were read from the spectrometer chart. From these relative intensities, $100 I/I_0$, where $I_0$ is the intensity of the strongest line or peak, and $d$ (obs.), the interplanar spacing in A, corresponding to the recorded lines, were calculated. In Table 1 the relative intensities are given in terms of the symbols S=strong, M=medium, MS=medium strong, MW=medium weak and VS=very strong. It should be understood that this X-ray diffraction pattern is characteristic of all the species of ZSM-5 compositions. Ion exchange of the sodium ion with cations reveals substantially the same pattern with some minor shifts in interplanar spacing and variation in relative intensity. Other minor variations can occur depending on the silicon to aluminum ratio of the particular sample, as well as if it has been subjected to thermal treatment. Various cation exchanged forms of ZSM-5 have been prepared. X-ray powder diffraction patterns of several of these forms are set forth below. The ZSM-5 forms set forth below are all aluminosilicates.

TABLE 2

X-ray diffraction—ZSM-5 powder in cation exchanged forms—d spacing observed

| As made | HCl | NaCl | CaCl₂ | RECl₃ | AgNO₃ |
|---|---|---|---|---|---|
| 11.15 | 11.16 | 11.19 | 11.19 | 11.19 | 11.19 |
| 10.01 | 10.03 | 10.05 | 10.01 | 10.06 | 10.01 |
| 9.74 | 9.78 | 9.80 | 9.74 | 9.79 | 9.77 |
| | | 9.01 | 9.02 | | 8.99 |
| 8.06 | | | | | |
| 7.44 | 7.46 | 7.46 | 7.46 | 7.40 | 4.46 |
| 7.08 | 7.07 | 7.09 | 7.11 | | 7.09 |
| 6.70 | 6.72 | 6.73 | 6.70 | 6.73 | 6.73 |
| 6.36 | 6.38 | 6.38 | 6.37 | 6.39 | 6.37 |
| 5.99 | 6.00 | 6.01 | 5.99 | 6.02 | 6.01 |
| 5.70 | 5.71 | 5.73 | 5.70 | 5.72 | 5.72 |
| 5.56 | 5.58 | 5.58 | 5.57 | 5.59 | 5.53 |
| 5.37 | | 5.38 | 5.37 | 5.38 | 5.37 |
| 5.13 | 5.11 | 5.14 | 5.12 | 5.14 | |
| 4.99 | 5.01 | 5.01 | 5.01 | 5.01 | 5.01 |
| | | 4.74 | | | |
| 4.61 | 4.62 | 4.62 | 4.61 | 4.63 | 4.62 |
| | | 4.46 | 4.46 | | 4.46 |
| 4.36 | 4.37 | 4.37 | 4.36 | 4.37 | 4.37 |
| 4.26 | 4.27 | 4.27 | 4.26 | 4.27 | 4.27 |
| 4.08 | | 4.09 | 4.09 | 4.09 | 4.09 |
| 4.00 | 4.01 | 4.01 | 4.00 | 4.01 | 4.01 |
| 3.84 | 3.85 | 3.85 | 3.85 | 3.85 | 3.86 |
| 3.82 | 3.82 | 3.82 | 3.82 | 3.83 | 3.82 |
| 3.75 | 3.75 | 3.75 | 3.76 | 3.76 | 3.75 |
| 3.72 | 3.72 | 3.72 | 3.72 | 3.72 | 3.72 |
| 3.34 | 3.75 | 3.65 | 3.65 | 3.65 | 3.65 |
| | 3.60 | 3.60 | 3.60 | 3.61 | 3.60 |
| 3.48 | 3.49 | 3.49 | 3.48 | 3.49 | 3.49 |
| 3.44 | 3.45 | 3.45 | 3.44 | 3.45 | 3.45 |
| 3.34 | 3.35 | 3.36 | 3.35 | 3.35 | 3.35 |
| 3.31 | 3.31 | 3.32 | 3.31 | 3.32 | 3.32 |
| 3.25 | 3.25 | 3.26 | 3.25 | 3.25 | 3.25 |
| 3.17 | | | 3.17 | 3.18 | |
| 3.13 | 3.14 | 3.14 | 3.14 | 3.15 | 3.14 |
| 3.05 | 3.05 | 3.05 | 3.04 | 3.06 | 3.05 |
| 2.98 | 2.98 | 2.99 | 2.98 | 2.99 | 2.99 |
| | | | | 2.97 | |
| | 2.95 | 2.95 | 2.94 | 2.95 | 2.95 |
| 2.85 | 2.87 | 2.87 | 2.87 | 2.87 | 2.87 |
| 2.80 | | | | | |
| 2.78 | | | 2.78 | | 2.78 |
| 2.73 | 2.74 | 2.74 | 2.73 | 2.74 | 2.74 |
| 2.67 | | | 2.68 | | |
| 2.66 | | | 2.65 | | |
| 2.60 | 2.61 | 2.61 | 2.61 | 2.61 | 2.61 |
| | 2.59 | | 2.59 | | |
| 2.57 | | 2.57 | 2.56 | | 2.57 |
| 2.50 | 2.52 | 2.52 | 2.52 | 2.52 | |
| 2.49 | 2.49 | 2.49 | 2.49 | 2.49 | 2.49 |
| | | | 2.45 | | |
| 2.41 | 2.42 | 2.42 | 2.42 | 2.42 | |
| 2.39 | 2.40 | 2.40 | 2.39 | 2.40 | 2.40 |
| | | | 2.38 | 2.35 | 2.38 |

TABLE 2—Continued

| As Made | HCl | NaCl | CaCl₂ | RECl₃ | AgNO₃ |
|---|---|---|---|---|---|
| | 2.33 | | 2.33 | 2.32 | 2.33 |
| 2.30 | | | | | |
| | 2.24 | 2.23 | 2.23 | | |
| | 2.20 | 2.21 | 2.20 | 2.20 | |
| | 2.18 | 2.18 | | | |
| | | 2.17 | 2.17 | | |
| | 2.13 | | 2.13 | | |
| | 2.11 | 2.11 | | 2.11 | |
| | | | 2.10 | 2.10 | |
| | 2.08 | 2.08 | | 2.08 | 2.08 |
| | | 2.07 | 2.07 | | |
| | | | 2.04 | | |
| 2.01 | 2.01 | 2.01 | 2.01 | 2.01 | 2.01 |
| 1.99 | 2.00 | 1.99 | 1.99 | 1.99 | 1.99 |
| | | | 1.97 | 1.96 | |
| 1.95 | 1.95 | 1.95 | 1.95 | 1.95 | |
| | | | | 1.94 | |
| | 1.92 | 1.92 | 1.92 | 1.92 | 1.92 |
| 1.91 | | | | 1.92 | |
| | | | | 1.88 | |
| 1.87 | 1.87 | 1.87 | 1.87 | 1.87 | 1.87 |
| | 1.86 | | | | |
| 1.84 | 1.84 | | | | 1.84 |
| 1.83 | 1.83 | 1.83 | 1.83 | 1.83 | |
| 1.82 | | 1.81 | | 1.82 | |
| 1.77 | 1.77 | 1.79 | 1.78 | | 1.77 |
| 1.76 | 1.76 | 1.76 | 1.76 | 1.76 | 1.76 |
| | | 1.75 | | | 1.75 |
| | 1.74 | 1.74 | 1.73 | | |
| 1.71 | 1.72 | 1.72 | 1.71 | | 1.70 |
| 1.67 | 1.67 | 1.67 | | 1.67 | 1.67 |
| 1.66 | 1.66 | | 1.66 | 1.66 | 1.66 |
| | | 1.65 | 1.65 | | |
| | | 1.64 | 1.64 | | |
| | 1.63 | 1.63 | 1.63 | 1.63 | 1.62 |
| | 1.61 | 1.61 | 1.61 | | 1.61 |
| 1.58 | | | | | |
| | 1.57 | 1.57 | | 1.57 | 1.57 |
| | | 1.56 | 1.56 | 1.56 | |

Zeolite ZSM-5 can be suitably prepared by preparing a solution containing tetrapropyl ammonium hydroxide, sodium oxide, an oxide of aluminum or gallium, an oxide of silica and water and having a composition, in terms of mole ratios of oxides, falling within the following ranges:

TABLE 3

| | Broad | Preferred | Particularly preferred |
|---|---|---|---|
| OH⁻/SiO₂ | 0.07–1.0 | 0.1–0.8 | 0.2–0.75 |
| R₄N⁺/(R₄N⁺+Na⁺) | 0.2–0.95 | 0.3–0.9 | 0.4–0.9 |
| H₂O/OH⁻ | 10–300 | 10–300 | 10–300 |
| YO₂/W₂O₃ | 5–100 | 10–60 | 10–40 | wherein R is propyl, W is aluminum and Y is silicon maintaining the mixture until crystals of the zeolite are formed. Thereafter the crystals are separated from the liquid and recovered. Typical reaction conditions consist of heating the foregoing reaction mixture to a temperature of from about 75° C. to 175° C. for a period of time of from about six hours to 60 days. A more preferred temperature range is from about 90 to 150° C. with the amount of time at a temperature in such range being from about 12 hours to 20 days.

The digestion of the gel particles is carried out until crystals form. The solid product is separated from the reaction medium, as by cooling the whole to room temperature, filtering, and water washing.

ZSM-5 is preferably formed as an aluminosilicate. The composition can be prepared utilizing materials which supply the appropriate oxide. Such compositions include for an aluminosilicate, sodium aluminate, alumina, sodium silicate, silica hydrosol, silica gel, silicic acid, sodium hydroxide and tetrapropylammonium hydroxide. It will be understood that each oxide component utilized in the reaction mixture for preparing a member of the ZMS-5 family can be supplied by one or more initial reactants and they can be mixed together in any order. For example, sodium oxide can be supplied by an aqueous solution of sodium hydroxide, or by an aqueous solution of sodium silicate; tetrapropylammonium cation can be supplied by the bromide salt. The reaction mixture can be prepared either batchwise or continuously. Crystal size and crystallization time of the ZSM-5 composition will vary with the nature of the reaction mixture employed. ZSM-8 can also be identified, in terms of mole ratios of oxides, as follows:

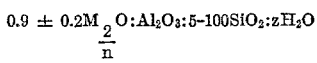

wherein M is at least one cation, n is the valence thereof and z is from 0 to 40. In a preferred synthesized form, the zeolite has a formula, in terms of mole ratios of oxides, as follows:

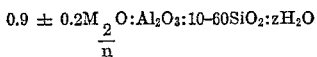

and M is selected from the group consisting of a mixture of alkali metal cations, especially sodium, and tetraethylammonium cations.

ZSM-8 possesses a definite distinguishing crystalline structure having the following X-ray diffraction pattern:

TABLE 4

| $d$ (A.): | $I/I_0$ | | |
|---|---|---|---|
| 11.1 | 46 | 3.04 | 10 |
| 10.0 | 42 | 2.99 | 6 |
| 9.7 | 10 | 2.97 | 4 |
| 9.0 | 6 | 2.94 | 3 |
| 7.42 | 10 | 2.86 | 2 |
| 7.06 | 7 | 2.78 | 1 |
| 6.69 | 5 | 2.73 | 4 |
| 6.35 | 12 | 2.68 | 1 |
| 6.04 | 6 | 2.61 | 3 |
| 5.97 | 12 | 2.57 | 1 |
| 5.69 | 9 | 2.55 | 1 |
| 5.56 | 13 | 2.51 | 1 |
| 5.36 | 3 | 2.49 | 6 |
| 5.12 | 4 | 2.45 | 1 |
| 5.01 | 7 | 2.47 | 2 |
| 4.60 | 7 | 2.39 | 3 |
| 4.45 | 3 | 2.35 | 1 |
| 4.35 | 7 | 2.32 | 1 |
| 4.25 | 18 | 2.28 | 1 |
| 4.07 | 20 | 2.23 | 1 |
| 4.00 | 10 | 2.20 | 1 |
| 3.85 | 100 | 2.17 | 1 |
| 3.82 | 57 | 2.12 | 1 |
| 3.75 | 25 | 2.11 | 1 |
| 3.71 | 30 | 2.08 | 1 |
| 3.64 | 26 | 2.06 | 1 |
| 3.59 | 2 | 2.01 | 6 |
| 3.47 | 6 | 1.99 | 6 |
| 3.43 | 9 | 1.95 | 2 |
| 3.39 | 5 | 1.91 | 2 |
| 3.34 | 18 | 1.87 | 3 |
| 3.31 | 8 | 1.84 | 1 |
| 3.24 | 4 | 1.82 | 2 |
| 3.13 | 3 | | |

Zeolite ZSM-8 can be suitably prepared by reacting a solution containing either tetraethylammonium hydroxide or tetraethylammonium bromide together with sodium oxide, aluminum oxide, and an oxide of silica and water.

The relative operable proportions of the various ingredients have not been fully determined and it is to be immediately understood that not any and all proportions of reactants will operate to produce the desired zeolite. In fact, completely different zeolites can be prepared utilizing the same starting materials depending upon their relative concentration and reaction conditions as it set forth in U.S. Pat. 3,308,069. In general, however, it has been found that when tetraethylammonium hydroxide is employed, ZSM-8 can be prepared from said hydroxide, sodium oxide, aluminum oxide, silica and water by reacting said materials in such proportions that the forming solution has a composition in terms of mole ratios of oxides falling within the following range.

$SiO_2/Al_2O_3$—from about 10 to about 200
$Na_2O$/tetramethylammonium hydroxide—from about 0.05 to 0.20
Tetraethylammonium hydroxide/$SiO_2$—from about 0.08 to 1.0
$Na_2O$/tetraethylammonium hydroxide—from about 80 to about 200

Thereafter, the crystals are separated from the liquid and recovered. Typical reaction conditions consists of heating the foregoing reaction mixture to a temperature of from about 100° C. to 175° C. for a period of time of from about six hours to 60 days. A more preferred temperature range is from about 150 to 175° C. with the amount of time at a temperature in such range being from about 12 hours to 8 days.

The foregoing product is dried, e.g. at 230° F. for from about 8 to 24 hours. Of course, milder conditions may be employed if desired, e.g., room temperature under vacuum.

As has heretofore been stated, a zeolite of the ZSM-5 type above-described is used in conjunction with a large pore zeolite, i.e. one having a pore size greater than 7 angstrom units which has the ability to act upon substantially all the components usually found in a commercial gas oil. Large pore aluminosilicates of this type are well known and include natural and synthetic faujasite or both the X and Y type, as well as zeolite L. Of these materials, zeolite Y is particularly preferred.

Both the large pore zeolites and the ZSM-5 type zeolites used in the instant invention usually have the original cations associated therewith replaced by a wide variety of other cations according to techniques well known in the art. Typical replacing cations would include hydrogen, ammonium and metal cations including mixtures of the same. Of the replacing metallic cations, particular preference is given to cations of rare earth, $Mg^{++}$, $Zn^{++}$, $Mn^{++}$, $Al^{+++}$, and $Ca^{++}$.

Typical ion exchange techniques would be to contact the particular zeolite with a salt of the desired replacing cation or cations. Although a wide variety of salts can be employed, particular preference is given to chlorides, nitrates and sulfates.

Representative ion exchange techniques are disclosed in a wide variety of patents including U.S. Pats. Nos. 3,140,249; 3,140,251; and 3,140,253.

Following contact with the salt solution of the desired replacing cation, the zeolites may be washed with water and dried at a temperature ranging from 150° F. to about 600° F. and thereafter heated in air or other inert gas at temperatures ranging from about 500° F. to 1500° F. for periods of time ranging from 1 to 48 hours or more. It has been further found in accordance with the invention that catalysts of improved selectivity and having other beneficial properties in catalytic cracking are obtained by subjecting the zeolite to treatment with steam at elevated temperatures ranging from 800°F. to 1600° F. and preferably 1000° F. and 1500° F. The treatment may be accomplished in atmospheres consisting partially or entirely of steam. This treatment may be accomplished within a commercial cracking unit, e.g. by gradual addition of the unsteamed catalyst to the unit.

A similar treatment can be accomplished at lower temperatures and elevated pressures, e.g. 350–700° F. at 10 to about 200 atmospheres.

The novel catalyst composites of this invention, in a particular embodiment, comprise a physical mixture of at least two different cracking components, one being an aluminosilicate having a pore size greater than about 7 angstroms units. In one embodiment, a mixture of catalyst particles is used in which each particle contains only one of the two types of zeolites. Thus, for example, a mixture of spray dried particles comprising ZSM-5 type crystals in a matrix and particles comprising faujasite crystals in a matrix may be added as make-up to the cracking unit. Alternatively, the catalyst components may be pelleted, cast, molded, spray-dried or otherwise formed into pieces of desired size and shape such as rods, spheres, pellets, etc.

The compositing of the aluminosilicate with an inorganic oxide can be achieved by several methods wherein the alminosilicates are reduced to a particle size less than 40 microns, preferably less than 10 microns, and intimately admixed with an inorganic oxide while the latter is in a hydrous state such as in the form of hydrosol, hydrogel, wet gelatinous precipitate, or in a dried state, or a mixture thereof. Thus, finely divided aluminosilicates can be mixed directly with a siliceous gel formed by hydrolyzing a basic solution of alkali metal silicate with an acid such as hydrochloric, sulfuric, acetic, etc. The mixing of the three components can be accomplished in any desired manner, such as in a ball mill or other types of mills. The aluminosilicates also may be dispersed in a hydrosol obtained by reacting an alkali metal silicate with an acid or alkaline coagulant. The hydrosol is then permitted to set in mass to a hydrogel which is thereafter dried and broken into pieces of desired shape or dried by conventional spray drying techniques or dispersed through a nozzle into a bath of oil or other water-immiscible suspending medium to obtain spheroidally shaped "bead" particles of catalyst such as described in U.S. Pat. 2,384,946. The aluminosilicate siliceous gel thus obtained is washed free of soluble salts and thereafter dried and/or calcined as desired.

In a like manner, the aluminosilicates may be incorporated with an aluminiferous oxide. Such gels and hydrous oxides are well known in the art and may be prepared, for example, by adding ammonium hydroxide, ammonium carbonate, etc. to a salt of aluminum, such aluminum chloride, aluminum sulfate, aluminum nitrate, etc., in an amount sufficient to form aluminum hydroxide which, upon drying, is converted to alumina. The aluminosilicate may be incorporated with the aluminiferous oxide while the latter is in the form of hydrosol, hydrogel, or wet gelatinous precipitate or hydrous oxide, or in the dried state.

The catalytically inorganic oxide matrix may also consist of a plural gel comprising a predominant amount of silica with one or more metals or oxides thereof selected from Groups I-B, II, III, IV, V, VI, VII, and VIII of the Periodic Table. Particular preference is given to plural gels or silica with metal oxides of Groups II-A, III and IVa of the Periodic Table, especially wherein the metal oxide is rare earth oxide, magnesia, alumina, zirconia, titania, beryllia, thoria, or combination thereof. The preparation of plural gels is well known and generally involves either separate precipitation or coprecipitation techniques, in which a suitable salt of the metal oxide is added to an alkali metal silicate and an acid or base, as required, is added to precipitate the corresponding oxide. The silica content of the siliceous gel matrix contemplated herein is generally within the range of 55 to 100 weight percent with the metal oxide content ranging from 0 to 45 percent.

The catalyst product can be heated in steam or in other atmospheres, e.g. air, near the temperature contemplated for conversion but may be heated to operating temperatures initially during use in the conversion process. Generally, the catalyst is dried between 150° F. and 600° F. and thereafter may be calcined in air, steam, nitrogen, helium, flue gas or other gases not harmful to the catalyst product at temperatures ranging from about 500° F. to 1600° F. for periods of time ranging from 1 to 48 hours or more. It is to be understood that the aluminosilicate can also be calcined prior to incorporation into the inorganic oxide gel. It is also to be understood that the aluminosilicate or aluminosilicates need not be ion exchanged prior to incorporation in a matrix but can be so treated during and/or after incorporation into the matrix. Preferably, the zeolite is metal exchanged, calcined and thereafter given a second exchange with a metal or hydrogen precursor.

It has been further found in accordance with the invention that catalysts of improved selectivity and having other beneficial properties in gas oil cracking are obtained by subjecting the catalyst product to a mild steam treatment carried out at elevated temperatures of 800° F. to 1600° F. and preferably at temperatures of about 1000° F. to 1500° F. The treatment may be accomplished in an atmosphere of 100% steam or in an atmosphere consisting of steam and air or a gas which is not harmful to the aluminosilicate. The steam treatment apparently provides beneficial properties in the aluminosilicate compositions and can be conducted before, after or in place of the calcination treatment.

The particle size of each type of zeolite making up the catalyst system is not narrowly critical but should be less than 100 microns and particle sizes within the range of from less than 0.1 to 10 microns are preferred. It is also to be noted that each individual component in the catalyst system need not be of the same particle size.

The particular proportion of one component to the other in the catalyst system is also not narrowly critical and can vary over an extremely wide range. However, it has been found that for most purposes the weight ratio of the ZSM-5 type aluminosilicate to the large pore size aluminosilicate can range from .05:1 up to 10:1 and preferably from 1:3 up to 2:1 and still more preferably 1:2 to 1:1.

The ZSM-5 type crystalline aluminosilicates and the crystalline aluminosilicates with pores greater than 7 angstroms may be added to a cracking unit as a mixture of crystallites within the same particles of catalyst composite, whether the particles are beads, extrudates, or spray-dried microspheres. Alternatively, a mixture of particles may be added to the cracking unit, some particles containing only the ZSM-5 type aluminosilicate crystallites and the other particles containing only the large pore aluminosilicate crystallites. In either case, the ratio of ZSM-5 type aluminosilicates to large pore aluminosilicates should be within the range of 1:20 to 10:1. The ratio of aluminosilicates within this range is controlled to produce the most desirable balance of high octane gasoline and $C_3$ and $C_4$ olefin yields.

Within the above description of the aluminosilicates which can be physically admixed in a porous matrix to prepare the catalysts of this invention, it has been found that certain aluminosilicates provide superior results when employed in catalytic cracking operations.

First of all, it is preferred that there be a limited amount of alkali metal cations associated with the aluminosilicates since the presence of alkali metals tends to suppress or limit catalytic properties, the activity of which as a general rule decreases with increasing content of alkali metal cations. Therefore, it is preferred that the aluminosilicates contain no more than 0.25 equivalent per gram atom of aluminum and more preferably no more than 0.15 equivalent per gram atom of aluminum of alkali metal cations.

With regard to the metal cations associated with the large pore aluminosilicate, the general order of preference is first cations of trivalent metals, followed by cations of divalent metals, with the least preferred being cations of monovalent metals. Of the trivalent metal cations, the most preferred are rare earth metal cations, either individually or as a mixture of rare earth metal cations.

Additionally, it is particularly preferred to have at least some protons or proton precursors associated with the aluminosilicate.

It is also preferred that both the aluminosilicates have an atomic ratio of silicon to aluminum of at least 1.25 preferably 1.8 and even more desirably at least 2.0.

It is to be understood, however, that this invention includes the use of catalyst compositions wherein both aluminosilicates are of the same class, e.g. both metal aluminosilicates; of different classes, e.g. one metal and one acid aluminosilicate; in the same matrix or in different matrixes, i.e., one aluminosilicate in silica-alumina and the other in silica-zirconia.

The process of the present invention can be performed utilizing fluid catalytic cracking systems having a plurality of reaction zones or risers. These systems generally have the risers through which the gas oil and fluid catalyst passes maintained in a single reaction zone housing. The gas oil and catalyst passes through the riser and into an open area within the housing where the catalyst is separated from the reaction components. The catalyst falls by gravity out through a stripping section and is thereafter routed to a regeneration zone or reactor usually located next to the housing for the risers. Within the overall housing (referred to as the reactor), the hydrocarbon components are removed through cyclone separators and passed to a fractionation column wherein the hydrocarbons are separated into their various components. Unreacted gas oil is generally recirculated to at least one of the risers and flows concurrently through the reactor together with fresh catalyst or regenerated catalysts emanating from the regenerator. Schemes generally applicable to the present process are shown in patents to Slyngstad et al., especially U.S. Pat. 2,994,659 (FIG. 2) and U.S. Pat. 3,188,185.

In the process of the present invention, the cracking catalyst has a particle size such that it can be passed in fluid flow through the risers, the reactor and the regenerator. The particle size will generally be between 10 and 1000 microns in diameter, preferably 40 to 80 microns. A particle size of about 60 microns diameter is considered optimum.

It should be understood, however, that the process of the present invention is preferably carried out by employing a gas oil charge stock in one riser wherein the major component is a virgin gas oil charge. A second riser, usually maintained under more severe conditions is employed for the fluid cracking of recycle gas oil which may contain a minor amount of virgin gas oil charge. Accordingly, the schemes shown in the aforesaid Slyngstad et al. patents would be modified so that into one riser is charged a gas oil wherein the major component is a virgin gas oil charge and into the second riser is charged a gas oil wherein the major component is a recycle gas oil. As indicated above, into one riser there is charged a gas oil having a major amount of a virgin gas oil charge. It is to be understood that minor amounts of other hydrocarbon constituents can be included in this charge. Generally speaking, the amount of virgin gas oil, based on the total amount of charge, will be between 60 and 100 percent by volume.

Similarly, the charge to the second riser which contains as a major component a recycle gas oil can contain other hydrocarbon materials. The recycle gas oil will be between 75 and 100 percent by volume based on the entire charge to the second riser.

The reaction conditions for the charge containing the virgin gas oil will include a temperature between 880 and 1150° F., a pressure between atm. and 100 p.s.i.g., a liquid hourly space velocity through the riser between 8 and 150 a catalyst to oil ratio between 3 and 20, an oil residence time in the riser between 1 and 30 sec. For the charge stock containing as its major component, a recycle gas oil, the cracking conditions will include a temperature between 850 and 1150° F., a pressure between atm. and 100 p.s.i.g., a catalyst to oil ratio of between 3 and 20, a liquid hourly space velocity of between 8 and 150 and an oil residence time of from between 1 and 30 sec. Usually, these latter reaction conditions will be more severe because the recycle gas oil is more difficult to crack than the virgin gas oil charge. The severity is desirably regulated by adjusting the catalyst to oil ratio and the residence time of the charge through the riser.

The specific catalyst composition in combination with the specific process scheme enables the conversion of a gas oil to a gasoline fraction having an especially high octane value. Additionally, $C_3$ and $C_4$ fractions produced by the cracking of normal paraffins obtained in situ within the first reaction zone become more olefinic owing in particular to the character of the ZSM-5 catalyst material. These $C_3$ and $C_4$ olefinic fractions have increased potential for alkylation production. The recovery of appreciable amounts of $C_3$ and $C_4$ olefins renders the alkylation of normal paraffins with these olefins significantly more feasible providing an economical method for the recovery of large quantities of iso-paraffins characterized by a high octane value.

The use of this scheme also enables the production of $C_5+$ gasoline fractions which are more olefinic at the same reaction conditions as provided by conventional cracking catalysts containing an active crystalline aluminosilicate cracking component. A higher gasoline Research octane number for this fraction is produced.

By using a dual component cracking catalyst in a cracking reactor having separate risers for the virgin charge and the recycle charge, a more olefinic and more crackable recycle gas oil is produced enabling the recovery of more and better gasoline fractions from the overall process under generally less severe conditions. The process enables the production of hydrogen via the dehydrogenation of the normal paraffins. Hydrogen containing streams recovered from a post cracking adsorber are richer in hydrogen making such streams more valuable as make-up hydrogen to hydrogen treating or hydrogen generating plants or alternatively as sources of hydrogen for reforming or hydroisomerization processes.

Alternatively, the use of a dual cracking catalyst containing two cracking components, one of which is ZSM-5 allows the production of a given olefin content for the $C_3$, $C_4$ and $C_5+$ products as well as the recycle stream at generally lower reaction temperatures than would be the case with a conventional fluid catalytic cracking catalyst containing a crystalline aluminosilicate. The utilization of such a catalyst composition in the process of the present invention can be used to accomplish the following objectives:

(1) To balance the olefin/isobutane feed to an alkylation plant;

(2) To control octane number of resultant alkylate through use of olefin streams particularly high in propylene, i.e. a normally higher $C_3/C_4$ olefin ratio.

(3) To control polymerization of olefins should such olefinic streams be employed for jet fuel or Number 2 fuel oil synthesis; to control alkylation of amylene employed for synthesis of jet fuel or Number 2 fuel oil insofar as yield and quantity are concerned.

By operation of the present process employing the dual component catalyst, gasoline components or mixtures of gasoline components plus alkylate of higher octane value and products are obtained. The recovery of cracking components and cracking components plus alkylate of higher octane value enables subsequent reforming operations desired to still further upgrade naphtha fractions to be performed under generally less severe conditions to make a given Research, Motor or Road pool octane number. The addition of this type of catalyst can thus be used to control severity of the refinery reforming operation. Accordingly, such control severity can be done to extend cycle life, limit temperature requirements, reduce the amount of catalyst or control hydrogen purity in the reformer tail gas.

Recycle composition to the second riser may be varied in the following fashion. It may be desirable to fractionate the gasoline to produce a 200° F. plus and a 200° F. minus fraction. The 200° F. plus fraction with an end point from 300 to 500° F. is recycled to the second riser and processed at 500 to 1300° F. at catalyst to oil ratios from 3 to 20. This may be mixed with heavier recycle stocks boiling predominantly between 400 and 1050° F. and recycled to the second riser.

If the recycle stream boils below 500° F. (end point) it may be recycled to a dense bed in the reactor. It would normally be fed into the bed in a predominantly (at least 50 vol. percent) vapor state for cracking but in relatively small quantities it could be fed as a liquid.

The recycle materials may be predominantly unreacted hydrocarbons, mixtures of reacted and unreacted hydrocarbons or entirely unreacted materials being sent through for a second pass to change its molecular composition.

For example, 200 to 450° F. naphtha may be recycled to the dense bed of the reactor in a vapor state to produce predominantly gasoline of a higher octane and $C_3/C_4$ feed to alkylation.

EXAMPLE 1

A catalyst consisting essentially of 10 percent REY, 5 percent REZSM-5 in a matrix comprising silica and clay from a regenerator containing a low percentage of carbonaceous material is introduced simultaneously into two risers where it is contacted with a virgin gas oil feed in the first riser and predominantly a recycle stream in the second riser. The catalyst in the inlet portion of the fresh feed riser is at a temperature of about 1150° F. The resulting suspension of catalyst in oil vapor at a temperature of about 900° F. at an average velocity of about 20 feed per second passes upwardly through the virgin riser into a reactor vessel. Conditions in the virgin riser include a catalyst to oil ratio of 6.0 and a weight hourly space velocity of 55. The vapor velocity in the virgin riser provides a residence time of about 5 seconds. Substantial conversion of the virgin gas oil (fresh feed) occurs in the riser and at these conditions amounts to a conversion of approximately 60 volume percent of the fresh feed products boiling below 430° F. The catalyst emerging from the riser contains substantially more coke than the catalyst exiting from the regenerator. It contains 0.45 to 0.5 weight percent at the time it enters the riser at the bottom.

An intermediate cycle gas oil fraction separated from the cracked products obtained from the cracking of the virgin gas oil in fractionation equipment is introduced into the inlet section of the second or cycle gas oil riser where it is contacted with the catalyst described above. The resulting catalyst vapor mixture at a temperature of about 930° F. passes upwardly through the cycle gas oil riser at an average velocity of about 25 feet per second with an average residence time of about 5 seconds. Other conditions in the recycle riser include a catalyst to oil ratio of 10 and a weight hourly space velocity of about 55. About 40 percent of the cycle gas oil is converted to products boiling below 430° F. by the time the products are disengaged from the catalyst in the reactor.

The effluent of the cycle gas oil riser joins the effluent from the virgin gas oil riser and passes through the reactor cyclones. The combined fresh feed riser cracking recycle riser cracking and cracking in the vapor phase leading to the cyclones provide an overall conversion basis fresh feed of 80 volume percent of the fresh feed products boiling below 430° F.

The reactor cyclones disengage cracked products from the entrained catalyst. The separated catalyst is separated and sent to catalyst stripping through a dipleg. Several cyclones are assembled in a series to achieve substantially complete separation and a plurality of such assemblies are employed to handle the volume of the vapor encountered. Effluent gases pass from the cyclone through a line to the plenum chamber wherein the gases from other cyclone assemblies are collected and discharged from the reactor through the reactor effluent line. The reactor effluent line conveys the cracked products to fractionation facilities, wherein the conversion products are recovered and separated into desired products and recycle streams by compression, absorption and distillation facilities well known in the art.

Steam is passed to the catalyst stripping section of the reactor to effect at least partial removal of entrained hydrocarbon from the moving catalyst mass. The stripping zone is provided with baffles attached to the wall of the stripper to effect counter current flow of catalyst to steam and stripped hydrocarbon.

Stripped catalyst is withdrawn from the bottom of the stripper through a spent catalyst standpipe at a rate controlled by a slide valve and discharges through the standpipe into the regenerator. In the regenerator, the spent catalyst is contacted with air introduced through an air distributor. Catalyst undergoing regeneration in the regenerator forms a dense bed. In the regenerator, carbon on the surface of the catalyst and in the pores of the catalyst is burned and the resulting flue gas passes upwardly and enters the regenerator cyclone wherein entrained catalyst is separated and returned to the regenerator dense bed through a dipleg. There is an assembly of cyclones arranged in parallel and in series to effect substantially complete separation of entrained solids from the flue gas. Effluent flue gas from the regenerator cyclone is passed through a line into the regenerator plenum chamber and outwardly through the flue gas line to vent facilities, which may include means to recover heat from hot flue gases, means to utilized unconsumed carbon monoxide by the generation of additional heat and means to recover energy by the generation of steam or by expansion through turbines with the generation of power as is well known in the art. Regenerated catalyst is withdrawn from the regenerator through the regenerated catalyst standpipe at rates controlled by the slide valves leading to the virgin riser and recycle riser. This catalyst standpipe supplies hot regenerated catalyst to the risers as described above.

We claim:

1. A method of cracking a hydrocarbon charge stock which comprises passing a hydrocarbon charge stock into a first reaction zone maintained under cracking conditions together with a catalyst composition comprising two cracking components, one of which is a zeolite component which has the X-ray diffraction pattern of Table 1 of the specification and identifiable, in terms of mole ratios of oxides, as follows:

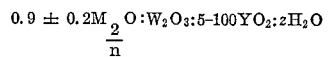

wherein M is a cation, $n$ is the valence of said cation, W is selected from the group consisting of aluminum and gallium, Y is selected from the group consisting of silicon and germanium, and $z$ is from 0 to 40, separating said catalyst composition from the reaction products of said first reaction zone, introducing a recycle hydrocarbon charge into a second reaction zone maintained under cracking conditions together with a catalyst composition comprising two cracking components, one of which is a zeolite component having the X-ray diffraction pattern of Table 1 of the specification and identifiable, in terms of mole ratios of oxides, as follows:

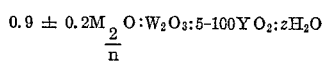

wherein M is a cation, $n$ is the valence of said cation, W is seleted from the group consisting of aluminum and gallium, Y is selected from the group consisting of silicon and germanium, and $z$ is from 0 to 40, withdrawing hydrocarbon material and catalyst from each reaction zone, and separately recovering withdrawn hydrocarbon material and catalyst.

2. A method according to claim 1 wherein a virgin gas oil is the hydrocarbon charge reacted under cracking conditions in said first reaction zone at a temperature between 880 and 1150° F. under a pressure between atmospheric pressure and 100 p.s.i.g., at a liquid hourly space velocity between 8 and 150 and at a catalyst to oil ratio in said first reaction zone between 3 and 20.

3. A method according to claim 1 wherein said recycle hydrocarbon charge is cracked in said second reaction zone at a temperature between 850 and 1150° F., at a pressure between atmospheric and 100 p.s.i.g., at a liquid hourly space velocity of between 8 and 150, at a catalyst to oil ratio of between 3 and 20.

4. A method according to claim 1 wherein the catalyst compositions employed in the first and second reaction zones comprise two zeolite components, one of which is a synthetic faujasite which has been base exchanged to remove sodium.

5. A method according to claim 4 wherein the weight ratio of synthetic faujasite to the other zeolite component in the catalyst composition is between 0.1 and 20.

6. A method according to claim 5 wherein said synthetic faujasite is REY.

7. A method according to claim 5 wherein said synthetic faujasite is REX.

8. A method according to claim 4 wherein said synthetic faujasite is HY.

9. A method according to claim 5 wherein M is selected from the group consisting of hydrogen and metals other than alkali metals.

10. A method according to claim 9 wherein M comprises rare earth, magnetism, zinc, manganese, aluminum or calcium.

11. A method according to claim 10 wherein the cracking components are composited with and intimately distributed throughout a common porous inorganic oxide matrix material.

12. A method according to claim 11 wherein said common matrix comprises an aluminoferous oxide.

13. A method according to claim 11 wherein said common matrix comprises an aluminoferrous oxide.

14. A method according to claim 13 wherein said siliceous oxide comprises silica/alumina.

15. A method according to claim 11 wherein the cracking components comprise between 2 and 25 percent by weight, based on the total weight of the catalyst composition.

16. A method according to claim 15 wherein the overall particle size of the catalyst compositions employed is between 10 and 1000 microns in diameter.

17. A method according to claim 16 wherein the overall particle size is between 40 and 80 microns in diameter.

18. A method according to claim 17 wherein said first and second reaction zones are risers in a continuous fluid catalytic cracking reactor, catalyst composition is continuously fed through both risers, continuously withdrawn, continuously regenerated in a regeneration zone and continuously reintroduced in both of said risers.

19. A method according to claim 18 wherein the hydrocarbon stream comprising unreacted hydrocarbon contains 200–450° F. naphtha obtained by the cracking of the virgin gas oil in the first reaction zone.

20. A method for converting gas oil to gasoline and lower boiling hydrocarbons which comprises
passing gas oil in admixture with a catalyst composition comprising a faujasite crystalline zeolite cracking component in admixture with a ZSM–5 type of crystalline zeolite cracking component as a suspension through a first cracking zone at a temperature in the range of 880 to 1150° F. for an oil residence time within the range of 1 to 30 sec.,
separating hydrocarbon material and catalyst passed through said first cracking zone into a hydrocarbon phase and a catalyst phase,
separating the hydrocarbon phase to recover a hydrocarbon fraction boiling from about 200° F. up to about 500° F. from hydrocarbons boiling about 200° F. and lower,
and passing the hydrocarbon fraction boiling from about 200 to 500° F. in admixture with hot catalytic material of a composition similar to that employed in said first cracking zone through a second cracking zone as a suspension at a temperature in the range of 500 to 1300° F. for an oil residence time within the range of 1 to 30 seconds.

21. The method of claim 20 wherein heavy recycle stock boiling in the range of 400 to 1050° F. is combined with the hydrocarbon fraction passed to said second cracking zone.

22. The method of claim 20 wherein the ratio between cracking components is within the range of 0.1 to 20 on a weight basis.

23. The method of claim 20 wherein the cracking components are combined in a clay bonding agent.

24. The method of claim 20 wherein a common catalyst regeneration zone separately provides catalyst to each of said first and second cracking zones.

25. A method for cracking hydrocarbon charge material which comprises
(a) passing into a first cracking zone maintained under cracking conditions said hydrocarbon charge material together with two cracking components, one of which is a ZSM–5 type of crystalline zeolite and the other selected from a faujasite known as zeolite X and zeolite Y having cracking activity,
(b) withdrawing hydrocarbon product material and catalyst from said first cracking zone and separating hydrocarbon material from catalyst material,
(c) separating said hydrocarbon product material to recover hydrocarbon materials boiling above gasoline from gasoline and lower boiling hydrocarbons, and
(d) cracking hydrocarbon material boiling above gasoline suspended with a dual cracking catalyst composition similar to that recited in step (a) above in a second cracking zone maintained at a temperature in the range of 850 to 1150° F. relying upon a catalyst to oil ratio and/or hydrocarbon residence time sufficient to increase the severity of the cracking operation effected therein over that employed in said first cracking zone.

26. The method of claim 25 wherein a common regenerator is relied upon to supply hot catalyst to each of said cracking zones at a catalyst to oil ratio selected from within the range of 3 to 20.

27. A method for cracking hydrocarbons which comprises,
heating a cracking catalyst mixture comprising at least two cracking components one of which is a crystalline aluminosilicate having an X-ray diffraction pattern of Table 1 and identifiable in terms of mole ratios of oxides by the relationship

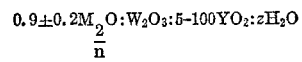

wherein M is a cation, $n$ is the valence of said cation, W is selected from the group consisting of aluminum and gallium, Y is selected from the group consisting of silicon and germanium, and $z$ is from 0 to 40, passing separate streams of said heated cracking catalyst mixture to each of separate first and second reaction zones, passing a first hydrocarbon feed material in contact with said catalyst upwardly through a first reaction zone under dispersed catalyst phase cracking conditions, and passing a second hydrocarbon feed material differing in composition from said first hydrocarbon feed in contact with said catalyst as an upwardly flowing suspension in said second reaction zone under cracking conditions, separating the suspensions at each end of the reaction zones into a hydrocarbon phase and a catalyst phase, stripping and regenerating the catalyst phase to effect heating thereof, and separating the hydrocarbon phase into desired hydrocarbon fractions.

28. The method of claim 27 wherein said first hydrocarbon feed material is a virgin gas oil and said second hydrocarbon feed comprises a product of cracking boiling in the range of from 200 up to an end point of about 500° F.

29. The method of claim 28 wherein said second hydrocarbon feed also comprises a recycle material boiling predominantly between 400 and 1050° F.

30. A method for converting hydrocarbons by cracking in the presence of a cracking catalyst which comprises, employing as the cracking catalyst a catalyst comprising two distinct cracking components each dispersed in a matrix material with one of the cracking components being a ZSM-5 type crystalline aluminosilicate and the other cracking component being a faujasite crystalline aluminosilicate having a pore size from about 6 to 15 angstrom units, passing the cracking catalyst under elevated temperature cracking conditions through parallel arranged multi-riser fluid catalyst cracking units suspended in hydrocarbon material, separately passing virgin gas oil, recycle gas oil or products of cracking boiling in the range of 200 to 450° F. as the hydrocarbon material in contact with suspended catalyst through said multi-riser cracking process under selected cracking severity conditions, separating and recovering hydrocarbon material from catalyst contacted in said multi-riser cracking units and regenerating the separated catalyst for reuse in the cracking units.

References Cited
UNITED STATES PATENTS
3,617,496   11/1971   Bryson et al. _____ 208—80

DELBERT E. GANTZ, Primary Examiner
G. E. SCHMITKONS, Assistant Examiner

U.S. Cl. X.R.
208—120, 164

UNITED STATES PATENT OFFICE
CERTIFICATE OF CORRECTION

Patent No. 3,748,251          Dated July 24, 1973

Inventor(s) EDWARD J. DEMMEL and HARTLEY OWEN

It is certified that error appears in the above-identified patent and that said Letters Patent are hereby corrected as shown below:

| | |
|---|---|
| Column 2, line 58 | "General" should be --Generally-- |
| Column 5, Table 2 (col.1) line 58 | "3.34" should be --3.64-- |
| Column 5, Table 2 (col.2) line 58 | "3.75" should be --3.65-- |
| Column 7, line 64 | "it" should be --is-- |
| Column 15, line 23 | "magnetism" should be --magnesium-- |
| Column 15, line 32 | "an aluminoferrous" should be --a siliceous-- |

Signed and sealed this 20th day of November 1973.

(SEAL)
Attest:

EDWARD M. FLETCHER, JR.
Attesting Officer

RENE D. TEGTMEYER
Acting Commissioner of Patents